(12) United States Patent
Kim et al.

(10) Patent No.: US 6,704,674 B2
(45) Date of Patent: Mar. 9, 2004

(54) CONTROL SYSTEM OF TILT ANGLE TESTER FOR SEATBELT RETRACTOR AND METHOD THEREFOR

(75) Inventors: Taek Kwang Kim, Bucheon-Shi (KR); Jun Yong Park, Wonju-Shi (KR); Byung Gul Choi, Wonju-Shi (KR); Dong Sub Lee, Chuncheon-Shi (KR)

(73) Assignee: Delphi Automotive Systems Sungwoo Corporation, Wonju-shi (KR)

( * ) Notice: Subject to any disclaimer, the term of this patent is extended or adjusted under 35 U.S.C. 154(b) by 0 days.

(21) Appl. No.: 10/079,810

(22) Filed: Feb. 22, 2002

(65) Prior Publication Data

US 2002/0128761 A1 Sep. 12, 2002

(30) Foreign Application Priority Data

Feb. 23, 2001 (KR) .......................................... 2001-9167

(51) Int. Cl.⁷ ............................................... G06F 19/00
(52) U.S. Cl. ......................................... 702/113; 73/161
(58) Field of Search ................................ 702/113, 108, 702/18, 19, 176, 178; 73/161; 242/382.3; 280/806; 701/1, 36, 45; 180/268, 271, 270, 274

(56) References Cited

U.S. PATENT DOCUMENTS

| 3,724,773 A | * | 4/1973 | Fisher ...................... 242/382.3 |
| 4,630,472 A | * | 12/1986 | Zimmerman et al. ......... 73/161 |
| 6,332,629 B1 | * | 12/2001 | Midorikawa et al. ....... 280/806 |

* cited by examiner

*Primary Examiner*—John Barlow
*Assistant Examiner*—Xiuqin Sun
(74) *Attorney, Agent, or Firm*—Jacobson Holman PLLC (57) ABSTRACT

A control system for a seatbelt retractor for a seatbelt retractor is to perform the operating performance test of the retractor mounted on a holder structure with at least one sensor and a locking device cooperating therewith throughout a wider range of tilt angle using a PLC, in which the control system includes a motor control portion connected to the PLC to control the rotation of motors at a tilt angle to be inputted in advance; a rotary cylinder control portion for controlling the rotating of a rotary cylinder in order to rotate a spool of the retractor; a stamping control portion for controlling the operating timing of a stamping portion; a memory for enabling various control operations of the PLC; a data register for storing digital data code values corresponding to a plurality of tilt angles; and a multi-axle motion controller for computing the digital data values, therefore enabling the tilt angle of the retractor to be tested with the holder structure being slanted.

11 Claims, 6 Drawing Sheets

D1 [0|0|0|1|0|1|0|1] : STORING BASIC VALUE(15°)
    positions 1, 5

D2 [0|0|1|1|1|0|0|0] : ANGLE VALUE OF DIGITAL CODE SOFTWARE(38°)
    positions 3, 8

D3 [0|1|0|1|0|0|1|1] : DISTANCE MOVED BY D1+D2(53°)
    positions 5, 3

FIG.4

FIG.5

CONTROL SYSTEM OF TILT ANGLE TESTER FOR SEATBELT RETRACTOR AND METHOD THEREFOR

BACKGROUND OF THE INVENTION

The invention relates to a tester for testing a tilt angle of a seatbelt retractor to be manufactured in various sizes, and particularly, to a control system of a tilt angle tester including at least one sensor and a locking device cooperating therewith and for enabling the tester to check the operating performance of a seatbelt retractor to be mounted in a slant state on a seat frame of a vehicle in general and a method therefor.

Prior Art

Generally, a seatbelt retractor is a kind of a safety apparatus for protecting a driver or passenger who wears a seatbelt in a vehicle in a manner to fasten the driver to a seat in an accident such as rapid acceleration or deceleration, crashing, etc., thereby preventing a serious wound due to the clashing against the vehicle structure or the escape out of the vehicle. In other words, the seatbelt is drawn out of the retractor in a normal state of the vehicle, but its pulling-out is hindered in an emergency or abnormal state of the vehicle, especially excessive slanted state of the vehicle, because the retractor is provided with a web sensor and a vehicle sensor mounted therein. The web sensor and vehicle sensor are supposed to detect the abnormal state of the vehicle on time in order to prevent the pulling-out of the seatbelt. The web sensor functions to detect the pulling-out acceleration of the seatbelt, and the vehicle sensor acts to detect the abnormal state of the vehicle due to the crashing accident. So, it prevents the pulling-out of the seatbelt at over predetermined rapid acceleration or below predetermined rapid deceleration along or cooperating with the web sensor. These sensors may not allow the driver or passenger to wear the seatbelt if the vehicle is under the abnormal state. Also, the pulling-out of the seatbelt put on by the driver may be prevented. Herein, it is noted that in order to secure the normal operating of the seatbelt retractor to be mounted in the vehicle, it is important to check the operating performance of the web sensor and the vehicle sensor according to the tilt angle of the seatbelt retractor as well as to check the function state of the seatbelt pulling-out, exactly. It is very critical to the performance of the seatbelt retractor.

A typical conventional technology is disclosed in U.S. Pat. No. 4,630,472 entitled "Seatbelt Test Apparatus". The patent adapts a system of testing the operating state of a seatbelt retractor in a manner that the seatbelt is pulled out by a power motor according to the change of the tilt angle of the retractor under the condition that it is completely wound around a bobbin of the retractor, after the seatbelt and retractor are mounted at a state similar to that mounted in a vehicle.

But, the patent has a disadvantage in that it is hard to evaluate the inherent operating relationship of the retractor, because the seatbelt has its own inherent tension taking bad effect on the seatbelt along with another factor in the vehicle. Also, the seatbelt may be arranged at a different position according to a kind of the vehicle, so the retractor has a different title angle corresponding to a kind of a vehicle to be mounted. Then, the retractor seems like to be differently operated at every place to be mounted in the vehicle. The patent has a difficulty in specifying the exact operation relationship of the retractor with a locking device that is operated by at least one sensor provided therein because of the restriction of the tilt angle to be tested.

An object of the invention is to provide a control system of a tilt angle tester for a seatbelt retractor for enabling a performance test of the seatbelt retractor associating with a locking device according to a PLC control method with respect to a relative wider tilt angle, in which the retractor comprises at least one sensor and the locking device cooperating with the sensor and a control method therefor.

Another object of the invention is to provide a control system of a tilt angle tester for a seatbelt retractor for controlling a title angle tester to judge whether the seatbelt is pulled out or drawn out according to an auxiliary angle of the retractor to be mounted under the state being not wound around on the retractor, thereby enabling the exact evaluation on the operating relationship of the retractor cooperated with a locking device without being the influence of the webbing.

Another object of the invention is to provide a control system of a tilt angle tester for a seatbelt retractor and for controlling the tilt angle tester to judge whether the seatbelt is drawn or pulled out, adapting an auxiliary tilt angle to be freely changed to the retractor with a seatbelt being not wound thereon and a control method therefor.

SUMMARY OF THE INVENTION

According to the invention, a control system of a tilt angle tester for a seatbelt retractor comprises a motor control portion connected to a PLC (Programmable Logic Controller) to control the rotation of motors at a tilt angle to be inputted in advance; a rotary cylinder control portion for controlling the rotating of a rotary cylinder in order to rotate a spool of the retractor; a stamping control portion for controlling the operating timing of a stamping portion; a memory for enabling various control operations of the PLC; registers for storing digital data code values corresponding to a plurality of tilt angles thereat; and a multi-axis motion controller for calculating or computing the digital data values, therefore enabling the tilt angle of the seat belt retractor to be tested with a holder structure being slanted.

A control method of a tilt angle tester for a seatbelt retractor comprises steps of turning on a starting switch after the seatbelt retractor is mounted in a holder structure; judging whether a basic value is set corresponding to a tilt angle to be inputted; fetching data of a digital code corresponding to the tilt angle; rotating at least one motor to correspond to a data value; rotating a spool of the seatbelt retractor by means of a rotating portion of a rotary cylinder; stopping the applying of an air pressure to the rotary cylinder before the 0.5 second of a system delay time at the time of the rotary cylinder being operated; and judging whether a web sensor and a vehicle sensor are in a good condition or not.

A control system of a tilt angle test apparatus for a seatbelt retractor comprises a motor control portion connected to a PLC to test the retractor mounted on a holder structure and to control the rotating of servo and step motors at a tilt angle to be inputted; a rotary cylinder control portion for controlling the rotating of a rotary cylinder so that a spool of the retractor is rotated; a stamping control portion for controlling the operating timing of a stamping portion; a memory for storing data values necessary for various control operating of the PLC, previously; a data register for storing digital code data values corresponding to the tilt angles; and a multi-axle operating controller for computing the digital code data values.

A control method of a tilt angle test apparatus for a seatbelt retractor comprises steps of turning on a starting switch after the retractor is mounted on a holder structure; judging whether a basic value corresponding to the tilt angle inputted is set; judging whether digital code corresponding to the tilt angle is set; fetching a data value at a digital code corresponding to the data value; rotating a spool of the retractor by a rotating portion of a rotary cylinder; stopping the supply of an air pressure before an inner delay time of 0.5 sec upon the operating of the rotary cylinder; and judging whether web and vehicle sensors of the vehicle are good or not and determining the state of the retractor.

BRIEF DESCRIPTION OF THE DRAWINGS

It now will be described in detail with respect to the accompanying drawings, in which.

DETAILED DESCRIPTION OF THE INVENTION

Figure 1A:
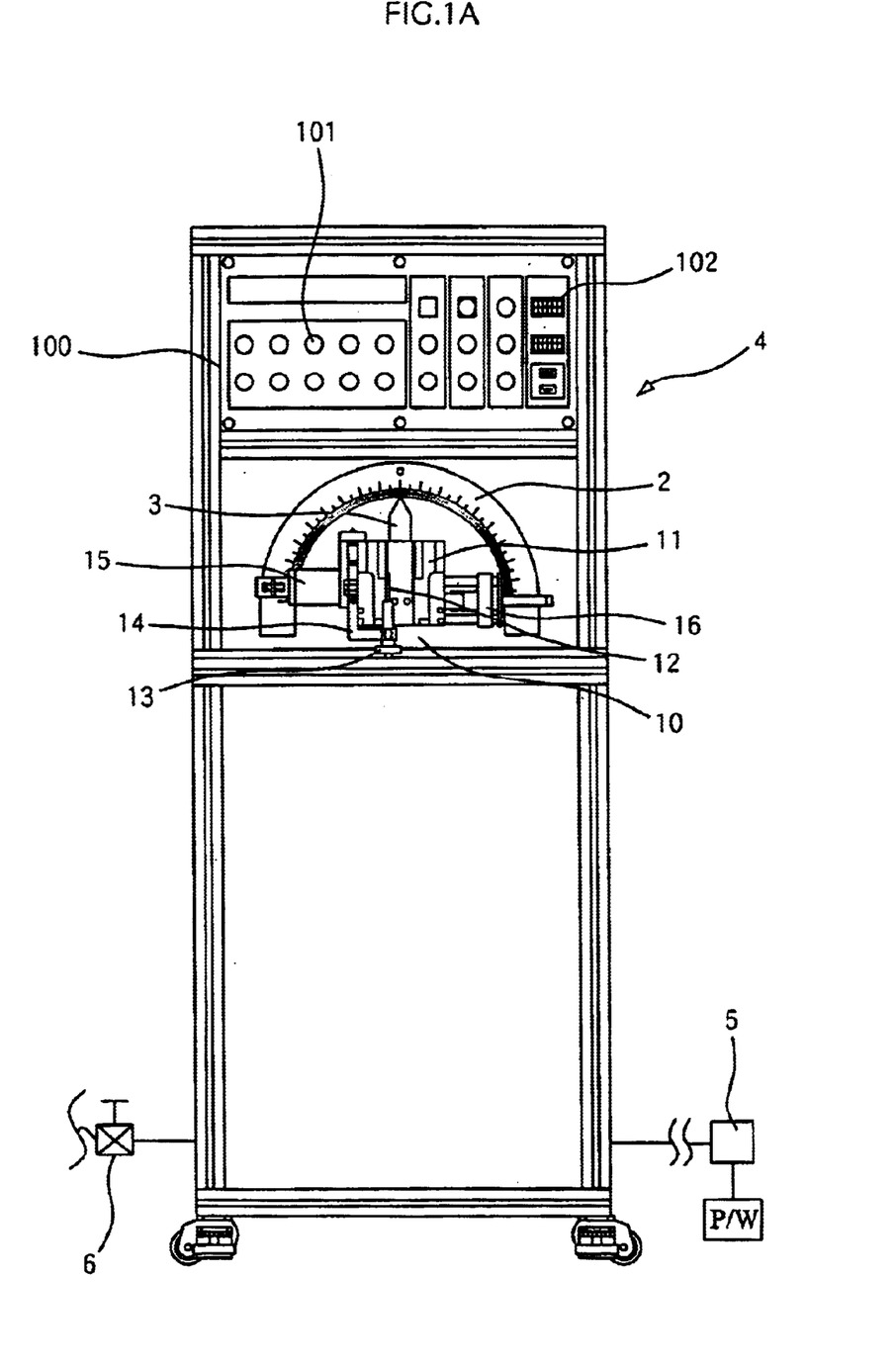
FIG. 1A is a front view illustrating a tilt test apparatus for a seatbelt retractor adapting a control system according to the invention.
Figure 1B:
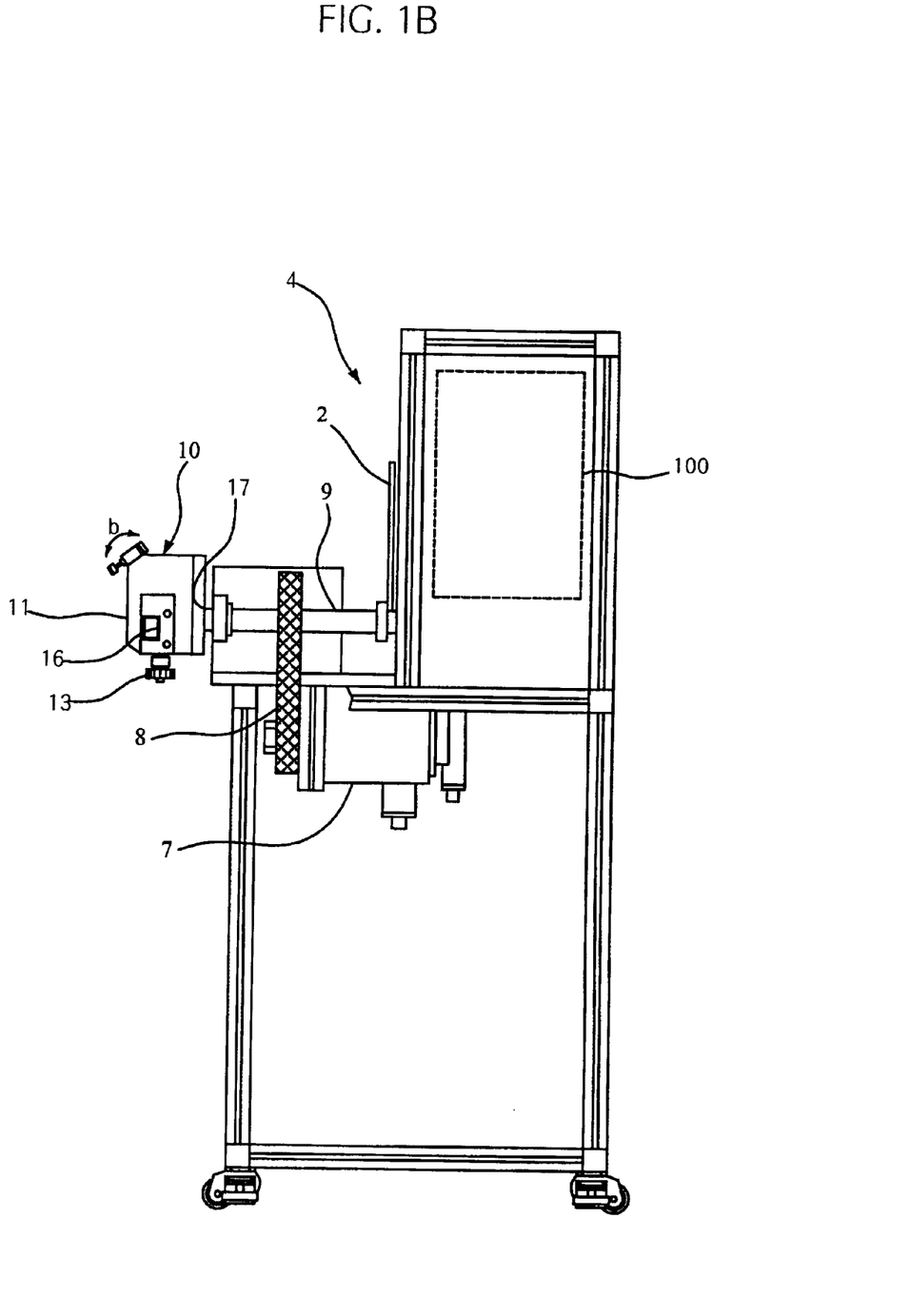
FIG. 1B is a side cross-sectional view illustrating the coupling relation of the tilt test apparatus of FIG. 1A.

Referring to FIGS. 1A and 1B, a control system is disposed on the upper portion of a tilt angle tester 4, which comprises a control portion 100 provided with indicating lamps 101 and an angle inputting portion 102. The control portion 100 controls the tilt angle tester to test and evaluate the operating of the retractor mounted in a holder structure 10, in which the retractor is provided with a returning spring, but the seatbelt is not assembled thereon.

The tilt angle tester 4 is operated under the control of the control portion 100 and comprises a tilt angle indicator 2 and its associated pointer 3 for indicating an angle in the range of 180 degrees between the left and right sides by the reference of a vertical line; a step motor 7 including a shaft 9, on which the indicating pointer 3 is vertically fixed at the front end, and a tooth belt 8 engaged with the shaft 9 and for rotating the indicating pointer 3 at a predetermined angle in response to the electrical signal of a tilt angle inputted from the control portion 100 along with the shaft 9 and the tooth belt 8; a servo motor 17 coupled with the indicating pointer 3 with a joint (not shown) to enable the multi-axis movement at the other end of the shaft 9; a holder structure 10 rotated forward and rearward by the operating of the servo motor 17; an external power inputting portion 5 supplying a power necessary for performing the test procedure; and an air pressure introducing portion 6 for introducing the air pressure into the holder structure 10.

The holder structure 10 comprises a main plate configured to mount a retractor with a webbing being not wound and a return spring assembly being locked by a safety pin therein; an U-shaped rotating portion 14 including a spool fixing rod 12 inserted into the retractor spool in a diametrical direction and a spool fixing rod holder 13 supporting the spool fixing rod 12, a rotary cylinder 15 for generating the rotating force to rotate the rotating portion at a high speed by the air pressure introduced from the introducing portion 6 and a stamping portion 16 operated by the air pressure to indicate the completion of the tilt test.

On the other hand, according to the invention, the control portion 100 is subject to performing four procedures in a great division of controlling indicating lamps 101 to indicate various operating states of a system in a manner to receive a tilt angle signal from an angle inputting portion 102 such as a key pad, a rotary angle inputting portion, etc. and process its control signal; control the rotating of a step motor 7 within the tilt angle range from 0 to 90 in a left side and from 90 to 180 in a right side; controlling the rotating of the rotary cylinder 15; and controlling the operating of an actuator constituted as the stamping portion 16.

Figure 2:
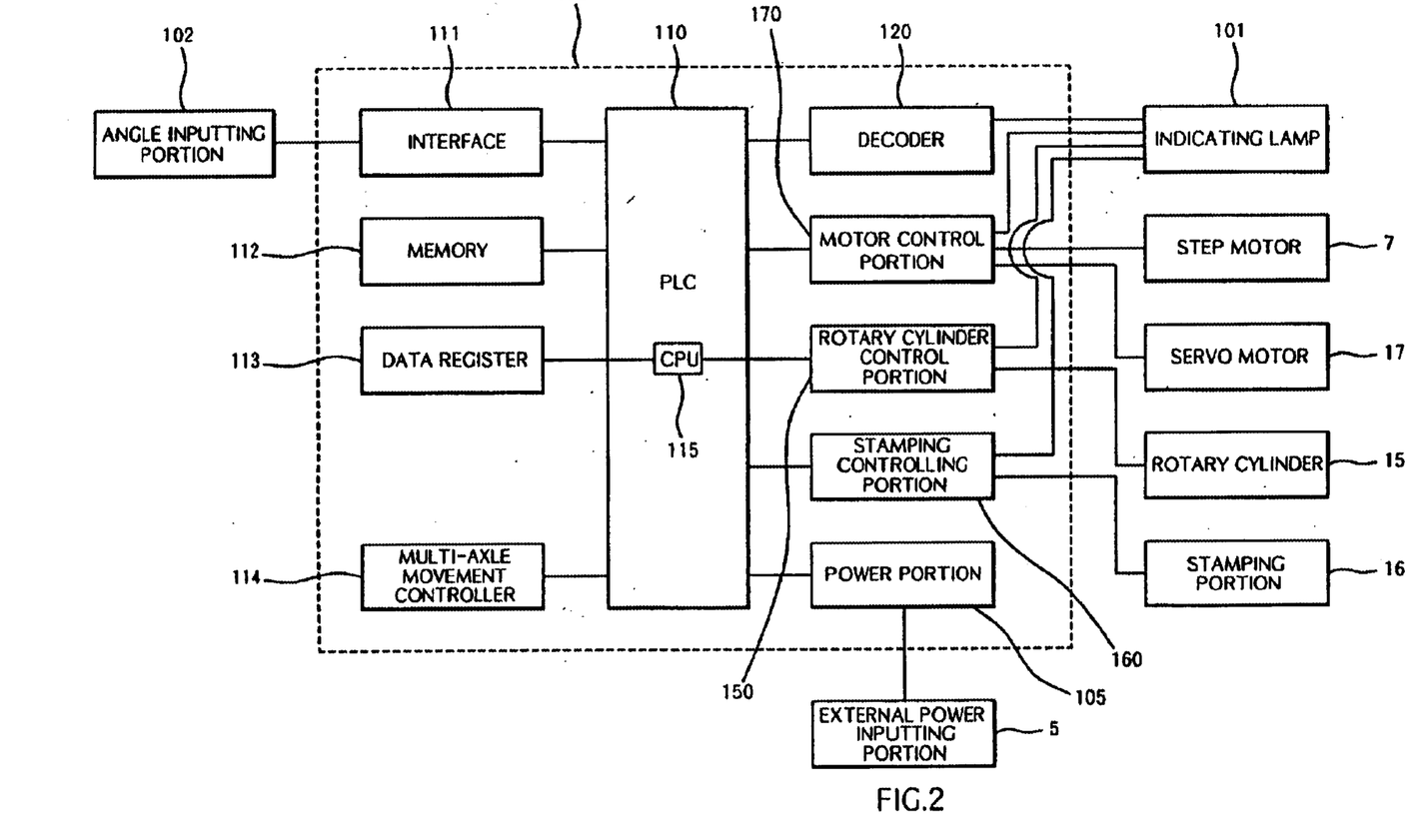
FIG. 2 is a block diagram illustrating a control system of a tilt test apparatus for a seatbelt retractor according to the invention.
Figure 2A:
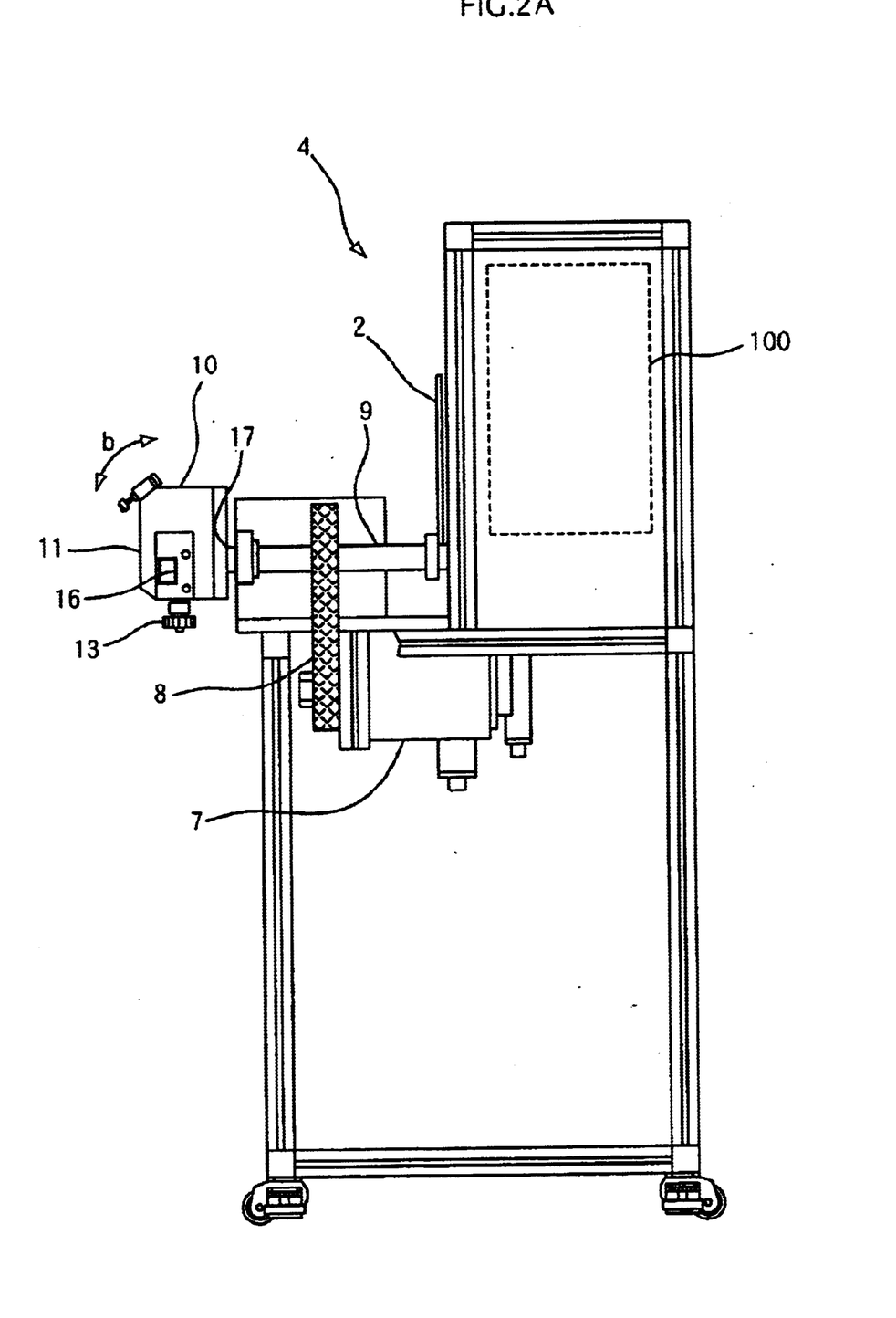

As shown in FIG. 2, in order to perform the above procedures the control portion 100 comprises a PLC (Programmable Logic Controller) 110, which includes an interface 111 connected to the angle inputting portion 102, a memory 102 for storing various control signals necessary for the system control; a data register 113 for storing digital code data values corresponding to a tilt angle within the relative wider range of 0 to 180; a multi-axle drive controller 114 provided with a digital code software to process 8 bit digital code data, which is commercially obtainable as Product Name "FX20GM" of Mitsubishi company; and a CPU 115 (Central Process Unit), in which the PLC 110 is connected to the indicating lamps 101 through a decoder 120 and includes a motor control portion 170, a rotary cylinder control portion 150, a stamping control portion 160 and a power portion 105 connected to the external inputting power portion 105.

The motor control portion 170 converts a data value corresponding to a tilt angle transferred from the PLC 110 into an operating control signal and applies it to the step motor 7 and the servomotor 17. The rotating of the step motor 7 leads to the rotating of the holder structure in any one of the left and right directions, while the rotating of the servo motor 17 induces the front or rear rotating of the holder structure corresponding to the forward or rearward rotation of the tilt angle.

The rotary cylinder control portion 150 performs the operating pretending to pull the webbing at a rapidly speed, for example controls the rotation of the rotary cylinder 15 at an operating timing period as described below in detail.

The stamping control portion 160 controls the stamping operating of a stamp (not shown) to stamp the test indication on the plastic right cover of a retractor passing a predetermined test regulation.

The power portion 105 is connected to the external inputting power portion 5 to supply the power to the CPU 115 and its control objects such as a multi drive controller, a motor controller, a rotary cylinder controller, a stamping controller, etc. and includes input and output ports.

According to the invention, the locking test angles following the retractor Regulations means tilt angles to be inputted, for example 15°, 27°, 38° in front and rear directions, etc., which are previously stored at a digital or binary code at the data register 112.

Figure 3:
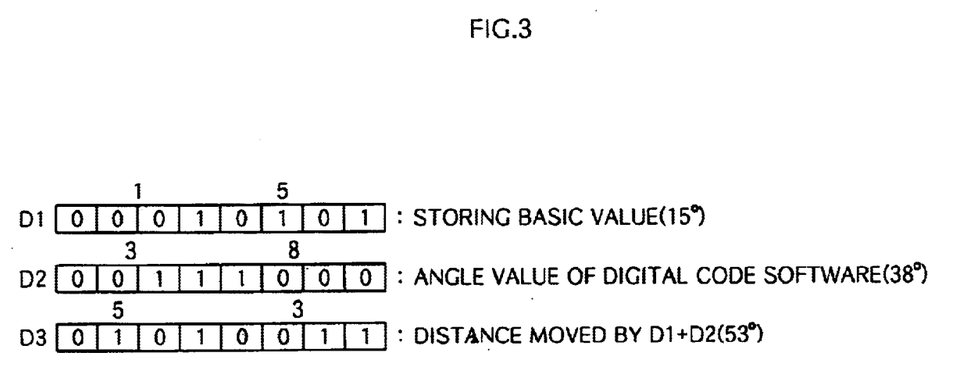
FIG. 3 is a view explaining the control computing operating of the control system of FIG. 2.

As shown in FIG. 3, the multi-axle operating controller 114 codes a first data value into a binary code by 4 bits dividing into one-digit and two-digit numbers. For example, if the basic value D1 is 15°, the two digit number of 10 is '0001' and the one digit number of 5 is '0101'. Similarly, the second data value D2 of the tilt angle 38° is converted into a digital code that means the binary code '0011' of 30 and the binary code '1000' of 8. Therefore, the multi-axle operating controller 114 computes third data value D3 corresponding to 53° of a total moving angle D1+D2 of the servo motor and the step motor to be operated.

Figure 4:
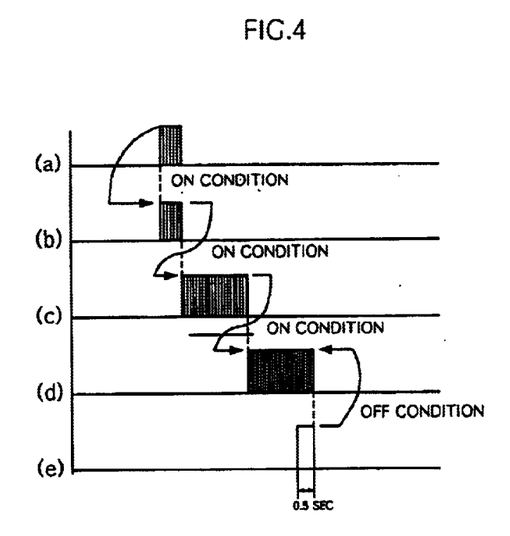
FIG. 4 is a timing diagram illustrating the operating of each part of the control system.

FIG. 4 shows a timing diagram of each portion of a control system according to the invention. A time sequence (a) shows that the starting button of a tilt angle test system for a safety belt retractor is pressed to turn on the system. A time sequence (b) initiates the multi-axle operating controller 114 to compute the total moving angle of the servo and step motors as described above. A time sequence (c) controls the step and servo motors to be operated at the falling edge of the time sequence (b) and then goes on a time sequence (d) when the moving or rotating of a predetermined distance of each of the servo and step motors is completed. The time sequence (d) is started to operate the rotary cylinder for a predetermined time period. The rotating portion of the rotary cylinder is reciprocally rotated by about 180°. Then, a time sequence (e) is generated using an inner timer, before the rotary cylinder is turned off, for example the stopping signal is generated prior to an internal delay time of 0.5 second.

Figure 5:
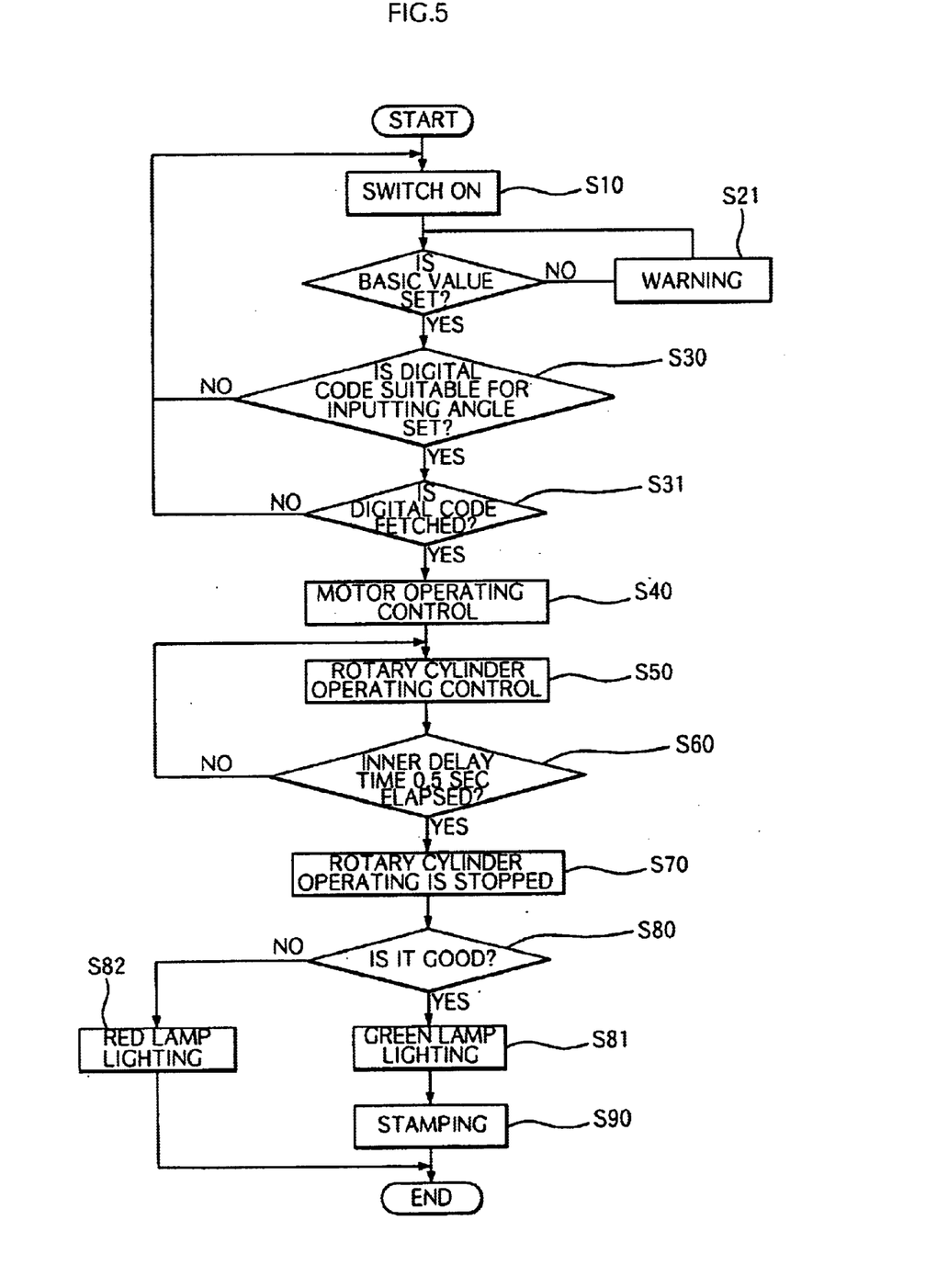
FIG. 5 is a flow chart illustrating a control method of the control system of FIG. 2.

Therefore, according to the invention, the title angle test system for the seatbelt retractor is operated as follows:

First, at step S10 a power switch is turned on to apply a power source to the tilt angle test system, a retractor with a webbing being not wound is mounted on a holder structure and then a test starting button is pressed. At that time, the retractor is positioned on a main plate with a spool fixing rode of a rotating portion being inserted into a spool. Thereafter, a predetermined tilt angle to be tested is inputted through an angle inputting portion 102. A control portion 100 performs step S20 to judge whether a basic value corresponding to the tilt angle is set. If the basic value is not set, step S20 goes on step S21 to give a warning indication for the tilt angle-inputting request.

If so, step S20 proceeds onto step S30 to judge whether the inputting value is set at a digital code corresponding to the tilt angle. If not, step S30 return to step S10. If so, step S30 goes onto step S31 to force a multi-axle operating controller to compute the total moving angle of servo and step motors to be operated and then judge whether corresponding data value is fetched at a digital code from a memory. If not, step S31 returns to step S10. If so, step S31 proceeds onto step S40 to transfer the fetched data value to a motor control portion so that the motor control portion converts it into an electrical signal corresponding to the size of the data value and applies the converted signal to the step and servo motors to control their operating. Therefore, the holder structure is slanted to correspond to the tilt angle previously set, and then a vehicle sensor is subject to being operated by changing the slanting angle of a weight constituted as a part thereof.

Thereafter, step S40 goes onto step 50 to control the operating of a rotary cylinder control portion according to the corresponding timing sequence. For example, the rotary cylinder control portion allows an air pressure to a rotary cylinder to rotate a rotating portion of the rotary cylinder, so that the spool-fixing rod of the rotating portion rotates the spool of the retractor. Also, the rotary cylinder control portion is continuously keeping the supply of the air pressure to the rotary cylinder. Then, step S50 proceeds onto step S60 to judge whether the inner delay time of 0.5 sec is left. If so, step S60 goes onto step S70 to stop the air pressure supply in advance prior to the inner delay time of 0.5 sec. At that time, the rotating portion of the rotary cylinder returns to its original position by the air pressure supplied.

Step S70 goes onto step S80 to judges whether the retractor is normal, if the vehicle sensor allows the spool to be rotated, and on the contrary, whether the retractor is abnormal, if the vehicle sensor doesn't the spool to be rotated, when the rotating portion of the rotary cylinder is rotated together with the spool of the retractor. And also, the control portion judges whether a web sensor is good or not based on that the spool is stopped within a range of a predetermined setting value, when the rotating portion is abruptly rotated at a high speed or the webbing is pulled over at a high speed. If the retractor is not good at the operating, step S80 jumps onto step S82 to light a red lamp and then jump to a last step. If the operating of the retractor is good, step S80 proceeds onto step S81 to light a green lamp.

Next, step S81 goes onto step S90 to send a stamping command to a stamping control portion. The stamping control portion control the supply of an air pressure to an actuator thereof so that a stamping seal mounted on the actuator is stamped on a right cover of a product or the retractor.

Therefore, it is noted that the control system for the seatbelt retractor comprises the control portion of a PLC to process a series of test operating procedures of performing the operating control of all parts thereof and the computation of the tilt angle of the retractor and indicating the test results, visually.

Acting Effectiveness of Invention

As described above, a control system for a seatbelt retractor according to the invention enables the operating test of a retractor on which a webbing is not wound, so that it can evaluate the webbing pulling or drawing possibility dependent upon the inherent operating property of the retractor with the influence of the webbing tension force being excluded.

Also, the control system facilitates various ranges of tilt angles to be inputted thereinto and enables the visual indication of the test results and the stamping on the retractor after the good determination of the test is confirmed.

Also, the control system enables the multi-axle control to test the tilt angle of the retractor without being limited, the test of the locking or releasing performance of the retractor with respect to a wider range of the tilt angle and the test of the webbing drawing possibility at numerous mounting angles upon the substantial mounting of the retractor on a vehicle.

What is claimed is:

1. A control system of a tilt angle test apparatus for a seatbelt retractor comprising:

a motor control connected to a PLC to test the retractor mounted on a holder structure and to control the rotating of servo and step motors at a tilt angle to be inputted;

a rotary cylinder control for controlling the rotating of a rotary cylinder so that a spool of the retractor is rotated;

a stamping control for controlling the operating timing of a stamping portion;

a memory for storing data values necessary for various control operatings of the PLC, previously;

a data register for storing digital code data values corresponding to the tilt angles; and a control portion including a multi-axle operating controller for computing the digital code data values.

2. The control system of a tilt angle test apparatus for a seatbelt retractor as claimed in claim 1, in which:

the tilt angles are stored into the digital codes at the data register.

3. The control system of a tilt angle test apparatus for a seatbelt retractor as claimed in claim 1, in which:
the control portion is arranged on the upper of a test apparatus, which includes indicating lamps and an angle inputting portion.

4. A control method of a tilt angle test apparatus for a seatbelt retractor comprising the steps of:
turning on a starting switch after the retractor is mounted on a holder structure;
judging whether a basic value corresponding to the tilt angle inputted is set;
judging whether digital code corresponding to the tilt angle is set;
fetching a data value at a digital code corresponding to the data value;
rotating a spool of the retractor by a rotating portion of a rotary cylinder;
stopping the supply of an air pressure before an inner delay time of 0.5 sec upon the operating of the rotary cylinder; and
judging whether web and vehicle sensors of the vehicle are good or not and determining the state of the retractor, and the determining of the state of the retractor further comprises the steps of supplying an air pressure to an actuator of the stamping portion to seal the indication of the retractor.

5. A control method of a tilt angle test apparatus for a seatbelt retractor comprising the steps of:
turning on a starting switch after the retractor is mounted on a holder structure;
judging whether a basic value corresponding to the tilt angle inputted is set;
judging whether digital code corresponding to the tilt angle is set;
fetching a data value at a digital code corresponding to the data value;
rotating a spool of the retractor by a rotating portion of a rotary cylinder;
stopping the supply of an air pressure before an inner delay time of 0.5 sec upon the operating of the rotary cylinder; and
judging whether web and vehicle sensors of the vehicle are good or not and determining the state of the retractor,
the step of fetching a data value at a digital code comprises the steps of coding data values dividing into one-digit and two-digit numbers into binary codes by 4 bits and fetching data values corresponding to the total moving angle of the motors.

6. A control system of a tilt angle tester for a seatbelt retractor comprising:
a motor control portion connected to a PLC to test the retractor mounted on a holder structure and to control the rotating of servo and step motors at a tilt angle to be inputted, in which the PLC includes an interface connected to the angle inputting portion, a memory for storing various control signals necessary for the system control, a data register for storing digital code data values corresponding to a tilt angle within a relative wider range of 0 to 180, a multi-axle drive controller provided with a digital code software to process 8 bit digital code data and a CPU;
a rotary cylinder control portion connected to the indicating lamps through a decoder and for controlling the rotating of a rotary cylinder so that a spool of the retractor is rotated;
a stamping control for controlling the operating timing of a stamping portion, so that a test indication on the plastic cover of the retractor to have passed a test regulation is stamped; and
a control portion including a multi-axle operating controller for computing the digital code data values in a manner to convert the data value corresponding to a tilt angle transferred from the PLC into an operating control signal and for applying it to a step motor and a servo motor.

7. The control system of a tilt angle tester for a seatbelt retractor as claimed in claim 6, wherein the tilt angles are stored into the digital codes at the data register.

8. The control system of a tilt angle tester for a seatbelt retractor as claimed in claim 6, wherein the motor control portion is arranged on the upper of a tester, which includes indicating lamps and an angle inputting portion.

9. A control method of a tilt angle tester for a seatbelt retractor comprising the steps of:
turning on a starting switch after the retractor is mounted on a holder structure and positioning a retractor on a main plate with a spool fixing rode of a rotating portion being inserted into a spool;
judging whether a basic value corresponding to a tilt angle inputted is set at a digit code and controlling a multi-axle operating controller to compute the total moving angle of servo and step motors to be operated;
fetching a data value at a digital code from a memory corresponding to the tilt angle;
transferring the fetched data value to a motor control portion in order to enable a motor control portion to convert it into an electrical signal corresponding to the size of the data value and apply the converted signal to step and servo motors, whereby a holder structure is slanted to correspond to the tilt angle previously set, and then a vehicle sensor is operated by changing the slanting angle of a weight constituted as a part thereof;
controlling the operating of a rotary cylinder control portion according to a timing sequence to rotate a spool of the retractor keeping the supply of an air pressure to the rotary cylinder and then to stop the supply of an air pressure before an inner delay time upon the operating of the rotary cylinder; and
judging whether web and vehicle sensors of the vehicle are good or not within a range of a setting value and determining the state of the retractor.

10. The control method of a tilt angle tester for a seatbelt retractor as claimed in claim 9, wherein the step of determining the state of the retractor further comprises steps of supplying an air pressure to an actuator of the stamping portion to seal the indication of the retractor.

11. The control method of a tilt angle tester for a seatbelt retractor as claimed in claim 9, wherein the step of fetching a data value at a digital code comprises steps of coding data values dividing into one-digit and two-digit numbers into binary codes by 4 bits and fetching data values corresponding to the total moving angle of the motors.

* * * * *